J. B. STROUD.
TIRE RIM TOOL.
APPLICATION FILED MAR. 24, 1915.

1,202,452.

Patented Oct. 24, 1916.
2 SHEETS—SHEET 1.

WITNESSES:

INVENTOR
John B. Stroud

ATTORNEYS

J. B. STROUD.
TIRE RIM TOOL.
APPLICATION FILED MAR. 24, 1915.
1,202,452.
Patented Oct. 24, 1916.
2 SHEETS—SHEET 2.
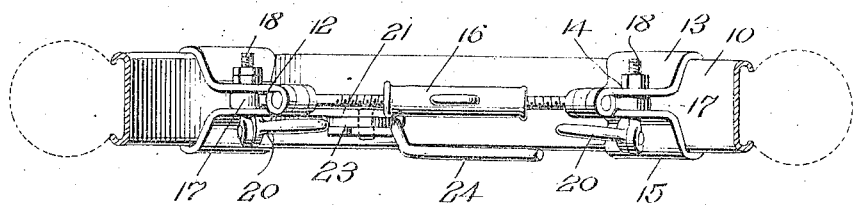
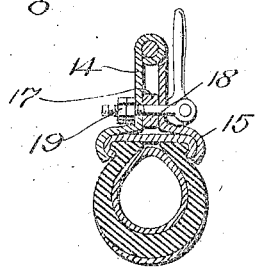 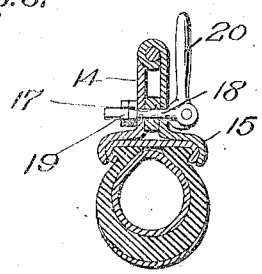
WITNESSES:
INVENTOR
John B. Stroud
BY Munn & Co.
ATTORNEYS

UNITED STATES PATENT OFFICE.

JOHN BELL STROUD, OF PASS CHRISTIAN, MISSISSIPPI.

TIRE-RIM TOOL.

1,202,452.  Specification of Letters Patent.  Patented Oct. 24, 1916.

Application filed March 24, 1915. Serial No. 16,623.

*To all whom it may concern:*

Be it known that I, JOHN B. STROUD, a citizen of the United States, and a resident of Pass Christian, in the county of Harrison and State of Mississippi, have invented a certain new and useful Improvement in Tire-Rim Tools, of which the following is a specification.

My invention relates to improvements in tools designed for use in breaking the joint of demountable rims previous to removing the tire therefrom, and holding the same in position while the tire is removed and replaced. In removing a clencher tire from its rim it is often difficult to part the rim at the joint, and after the same has been parted it is equally as difficult to lock the same together.

The object of my invention is to provide a device, for overcoming this difficulty, which is simple in construction and operation, effective and inexpensive.

With this and other objects in view my invention consists of a tool of the character mentioned comprising clamp members to engage the ends of a split rim, means for lifting one end above the other and means for causing the lifted end to overlap the other end, thus reducing the shape and size of the rim to permit the ready removal and replacing of tire shoe.

My invention consists further in certain features of construction, arrangement and combination of parts as will be hereinafter described and pointed out in the claims, reference being had to the accompanying drawing in which—

Figure 1:
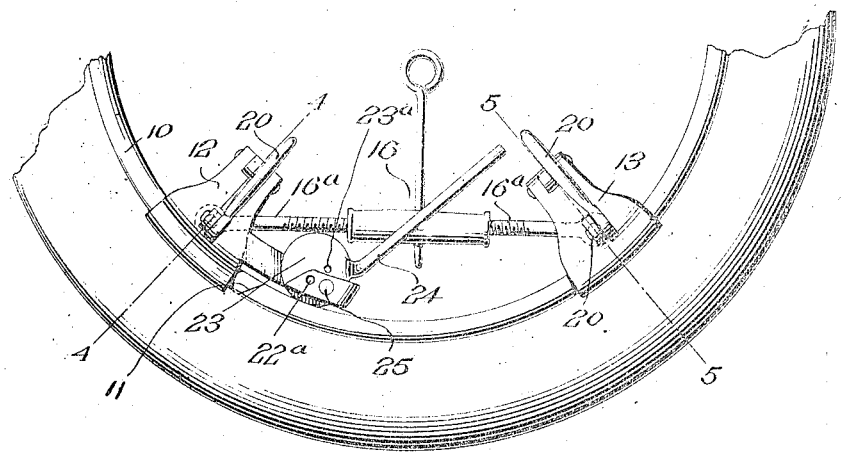
Figure 2:
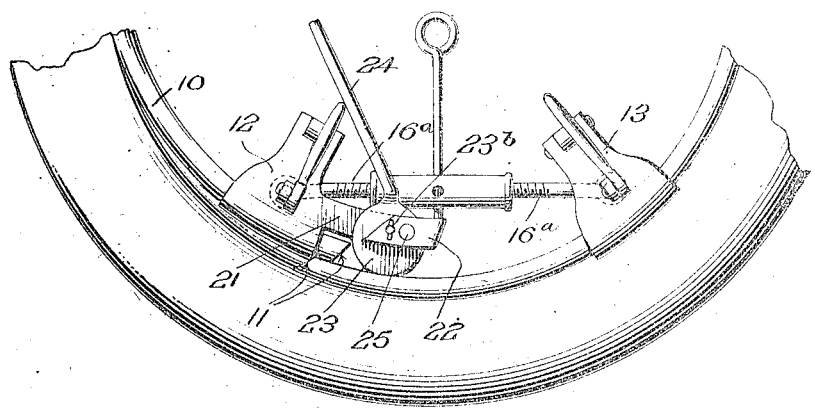

Figure 1 is a side elevation showing my invention as applied. Fig. 2 is a similar view showing the ends of the rim separated and overlapping. Fig. 3 is a plan view of the device as shown in Fig. 1. Fig. 4 is a section on line 4—4 of Fig. 1. Fig. 5 is a section on line 5—5 of Fig. 1. Fig. 6 is an elevation showing a modification. Fig. 7 is a similar view of another modification.

Referring more particularly to the drawings, 10 represents a portion of a split demountable rim of ordinary type, the joint being represented by 11 on Fig. 1 of the drawing, said joint being on the bias or at an angle, as shown.

My device as shown comprises two clamp members 12 and 13 each consisting of side plates 14 hinged or crimped together at their upper ends, their lower ends being spread apart and bent downwardly to form the gripping flanges 15 and these clamps are connected by a turn buckle 16 as shown in Figs. 1, 2 and 3 the bolts 16ᵃ of the turn buckle have eyes 17 at their smooth ends which fit between the jaws 14 of the clamps 12 and 13 and are retained between said jaws by the clamp bolts 18 passing through the eyes of the turn buckle and the two jaws of the clamp, these bolts having at one end the nuts 19 and on the other are pivoted the cam levers 20.

Extending laterally from one jaw of the clamp 12 (the clamp which in practice is placed near the joint of the rim) is an arm 21 which may be integral therewith, or rigidly secured thereto; this arm has a bent back end portion 22 between which and the arm proper is pivotally mounted the eccentric 23 having the operating handle 24: while this arm may be made of a strip bent back on itself, it can be a solid piece with an enlarged portion split or slitted to receive the eccentric and its axis 25; the center or coupling member of the turn buckle is operated by a rod 26 passed through openings in the same as is usual in this type of turnbuckles, or it may be rotated by any other suitable means.

To operate my device, the clamps 12 and 13 are applied to the rim 10 as indicated in Fig. 1 the jaws of the clamps having been gripped on the rim by the clamp bolts and cams 20 so that the entire device is in a rigid condition; the handle 24 of the eccentric 23 is then thrown to the left which action lifts that end of the rim which is gripped by the clamp 12 above and out of alinement with the rim on the other side of joint; when this has taken place the turnbuckle is manipulated to draw the clamps 12 and 13 toward each other which brings the ends of the rim to the position shown in Fig. 2 or overlapping, thus reducing the shape and diameter of the rim; this will permit the tire shoe to be removed and replaced quickly and easily.

In Fig. 6 is shown a rear view of another form of means for drawing the clamps 12 and 13 together: in this form a disk 26 has diametrically opposite bearings 27 in which are mounted the bolt members 16ᵇ, corresponding to the bolts 16ᵃ of the turnbuckle; these bolts carrying bevel pinions meshing with a beveled gear 29 rotatably mounted on the disk 26 said gear 29 having a square end over which the square socket of a crank 30 is fitted in order to operate the device and also serve as a wrench. The bolts 16$^b$ are threaded at their outer ends and engage nuts 31 swiveled on one jaw of the clamps 12 and 13 as shown in Fig. 6; the inner ends of bolts 16$^b$ will be stepped or supported beneath the gear 29.

In Fig. 7 another form of operating mechanism is shown: in this device the clamps 12 and 13 are the same as shown in Figs. 1, 2, 3, 4 and 5: upon the clamp bolts 18 are mounted the outer ends of links 32, the inner ends of same being pivoted to the disk 33 which has a lever handle 34 eccentrically positioned there and extending away from the same: the inner ends of the links 32 are pivoted to the disk 33 near its circumference as at 35 and 36 and in a straight line with each other so that when the hand lever 34 is swung to the right the point 35 will be above 36 and toward the right, the point 36 at the same time passing beneath 35 until they are on opposite sides of the center of the disk which forms a lock to hold the overlapped ends of the rim in such position.

In Fig. 1 on the eccentric 23 is shown an opening 23$^a$ and on the arm 22 is a similar opening 22$^a$; when the lever 24 is thrown over to position shown in Fig. 2 a pin 22$^b$ is passed through the arm 22 and the eccentric 23 and locks the eccentric in place and holds the ends of the rim overlapped; to facilitate the movement of the lever 24 it is offset so that it will pass the turnbuckle and clamp without striking the same or being strained past the same.

It will thus be seen that I provide a simple, cheap and efficient tool for removing and replacing tire shoes from demountable clencher rims.

The jaws 14 of the clamps 12 and 13 may be crimped together at the top instead of hinged, or indeed, the jaws may be integral, the clamp being made of a single piece of sheet metal and bent to form twin jaws.

I claim:

1. A device of the character described consisting of a pair of clamps adapted to grip the opposite ends of a split rim, means carried by one of said clamps for lifting one end of the rim out of alinement with the other end, and a coupling member independent of the lifting means for coupling the clamps and for moving the ends of the rim to or from each other after one of them has been lifted.

2. A device of the character described, consisting of a pair of clamps adapted to grip the opposite ends of a split rim, longitudinally adjustable coupling means connecting said clamps, and a cam member carried by one of said clamps and independently of the coupling means for lifting one end of the rim.

3. A tire rim tool including a turnbuckle and its rods, a pair of clamping members pivotally connected to said rods and adapted to be secured to the ends of a split rim, a bracket arm projecting from one clamping member, and a lever cam carried by said arm for engaging the inner face of one end of a split rim and forcing it out of alinement with the other end of said rim.

JNO. BELL STROUD.

Witnesses:
REBELLIA A. BRANDT STROUD,
E. J. ADAM.